United States Patent [19]

Bonissone et al.

[11] Patent Number: 4,605,199

[45] Date of Patent: Aug. 12, 1986

[54] BALL VALVE PROVIDED WITH A LOCK RING

[75] Inventors: Giancarlo Bonissone; Piero Mulas, both of Genoa, Italy

[73] Assignee: F.I.P. Formatura Iniezione Polimeri, S.p.A., Sori, Italy

[21] Appl. No.: 649,891

[22] Filed: Sep. 12, 1984

[30] Foreign Application Priority Data

Oct. 4, 1983 [IT] Italy ............................. 15261/83[U]

[51] Int. Cl.[4] ............................................. F16K 25/00
[52] U.S. Cl. ................................... 251/171; 251/292;
 251/317; 137/328; 16/121; 16/DIG. 30
[58] Field of Search ............... 251/148, 152, 171, 192,
 251/291, 292, 315, 317; 137/327, 328, 329, 68
 R, 797, 269; 16/114 R, 118, 121, D30; 74/553

[56] References Cited

U.S. PATENT DOCUMENTS

| | | | |
|---|---|---|---|
| 1,664,270 | 3/1928 | Shevlin | 137/328 |
| 3,717,323 | 2/1973 | Geipel | 251/317 |
| 4,072,161 | 2/1978 | Schoeneweis et al. | 137/68 R |
| 4,099,705 | 7/1978 | Runyan | 251/171 |
| 4,449,694 | 5/1984 | Hobart et al. | 251/171 |
| 4,463,777 | 8/1984 | Taniguthi et al. | 137/797 |

*Primary Examiner*—Martin P. Schwadron
*Assistant Examiner*—Sheri M. Novack
*Attorney, Agent, or Firm*—Robert E. Burns; Emmanuel J. Lobato; Bruce L. Adams

[57] ABSTRACT

A ball valve having a valve body within which is provided a ball for opening and closing the valve. The ball valve is constructed with bushings and lock rings arranged for ease of assembly and disassembly for inspection of the wear of internal ring seals. An internal lock ring is provided with recesses in an end face for receiving a tool which is part of the operating handle of the valve.

2 Claims, 6 Drawing Figures

BALL VALVE PROVIDED WITH A LOCK RING

BACKGROUND OF THE INVENTION

Ball valves are known which consist of a substantially cylindrical valve body and a rotatable ball-shaped valve element which is drilled and actuated to the closed and opened positions by an operating handle through an operating shaft. In ball valves of known type the valve body is provided, on one side, with a sort of inwardly extending flange, acting as a seat for an annular gasket which bears against the ball-shaped valve element on the other side. On the opposite side, a second annular gasket for the rotatable ball is supported by a rest bushing inserted inside the valve body. The flanged ends of the pipes converging on the valve are tightened to both ends of the valve body by means of lock rings which are screwed to the external surface of the valve body.

This kind of arrangement allows to remove the valve in order to verify the state of wear of the gaskets, without removing either valve duct.

However, in some cases, it may be necessary to disassemble the pipe connected to one of the two sides of the valve, the valve being closed, while in the other pipe a fluid is still under pressure. Because of this necessity, it is compulsory to place the valve in such a way that the gasket rest bushing is always set upstream of the pressure side; otherwise, the bushing, the related gasket and the valve ball itself, could be shot out of the valve body by the pressure on the other side of the valve.

Such type of known valve has two defects: first of all, when assembling it, the flow direction of the fluid should be known: but even so an assembling mistake is always possible; secondly the pipe may be inserted into a complex circuit where, depending on the system regulating conditions, the pressure can be indifferently applied on either side of the valve.

OBJECT OF THE INVENTION

The purpose of the present invention is to obviate such disadvantages by providing a lock ring screwed inside the valve body, thus forming a lock for the gasket rest bushing.

The valve can thus be assembled indifferently in either direction, and still it is always possible to disassemble one of the two parts of the gasket when the other is under pressure.

DESCRIPTION OF A PREFERRED EMBODIMENT

Figure 1:
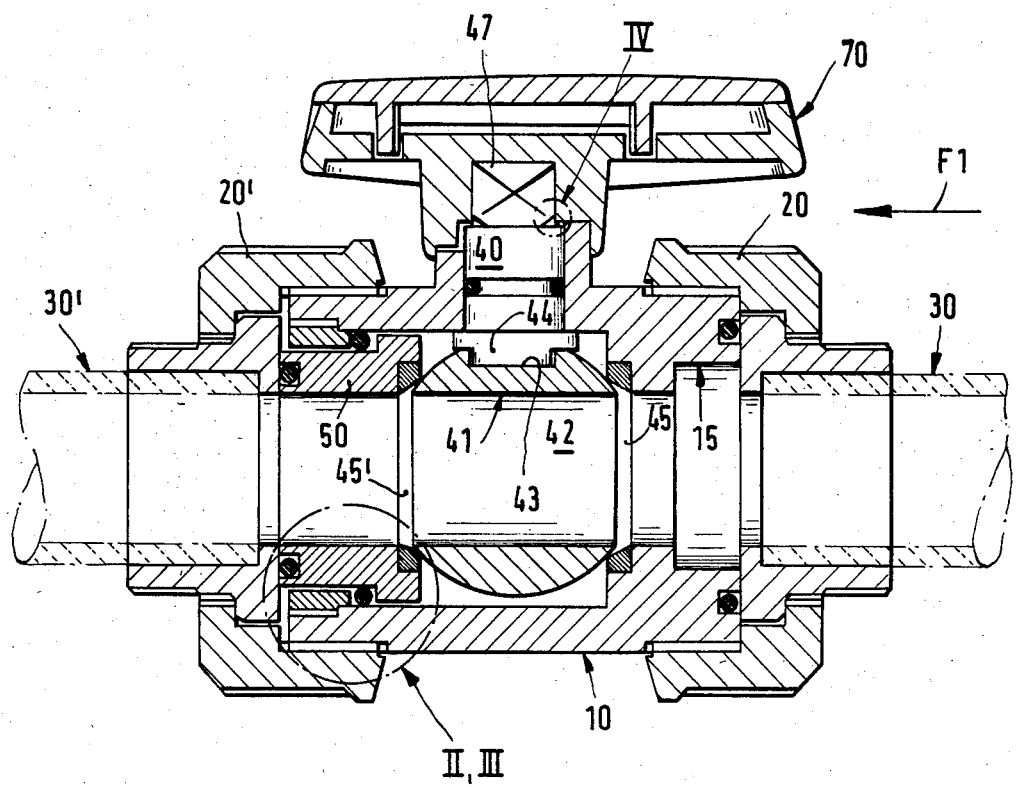
FIG. 1 is a vertical section of the valve, according to the invention, in an assembled position.

With particular reference to the above figures: 10 indicates the valve body or valve "box"; it has a substantially cylindrical external shape 11 and is provided with a threaded part 12, 13 at its two ends, for two lock rings 20, 20'.

The lock rings 20 and 20' are provided with a tubular section 21, 21' having an inner thread 22, 22' to engage thread 12 and 13; at one end they are provided with a flange 23, 23' which is turned inwards of the ring in order to engage external flanges 31, 31' of pipes 30, 30'.

It should be noted that, in a known way, lock rings 20, 20' are provided externally with projections 24, 24' and grooves 25, 25', so that the lock ring may be grasped by means of a suitable tool.

Again in a known way, each pipe 30, 30' can form a single piece with external flange 31, 31'; in a known way, in most cases pipes 30, 30' consist of a tube 32, 32' engaged inside an end bushing 33, 33' provided with the above said external flange 31, 31'. Tube 32, 32' may be joined to the end bushing 33, 33' in various ways: by screwing, glueing or mechanical shrinking.

Internally, valve body 10 is provided, at one end, to the left of the figures, with a bore 14 extending to the central part of the valve body. At the other end, to the right of the figures, the bore is partially closed by an annular flange extending 15 inwardly towards the axis of the valve body and acting as stop for the frontal end 34 of pipe 30. The frontal end 34 of pipe 30 bears against the frontal end 16 of the valve body.

An annular groove 17, placed against the internal flange 15 and fit to receive a sealing O-ring 18, is provided in a known way on the frontal surface 16 of the valve body.

Valve body 10 is provided with a radial passage 19 for the driving shaft 40 of valve element 41, consisting in a rotatable ball traversed by a diametral passage 42 and provided with an impression 43 fit to receive a cylindrical tang 44 of non-circular section, projecting downwards from the valve stem or shaft 40.

As shown in FIG. 1, between flange 15 and ball 41 there is an annular gasket 45, housed on an annular step 46 of flange 15 of valve body 10. As known, in ball valves of this type the second annular gasket 45' of the ball-shaped valve element 41, (left of the figures), is pushed against the ball 41 by the second lock ring 20' which, instead of pushing during operations the frontal end of flange 31' of pipe 30' directly against the frontal left end 16' of valve body 10, pushes said flange 31' against the base 51 the of rest bushing 50 of gasket 45'. On the axially external frontal surface 51 of the rest bushing 50 the of gasket 45' there is provided an annular groove 17' housing a lock ring 18'. Therefore, in a known way, and with particular reference to FIG. 1, the valve is provided with the following elements in succession: pipe 30, flange 15 of valve body 10, the sealing gasket 45', ball-shaped valve element 41, rest bushing 50 of gasket 45', pipe 30'.

Besides these known elements, locking nuts 20 and 20' are also typical of these ball valves.

According to the invention, the end of bore 14, opposite to flange 15, is provided with a thread 60 fit to receive a lock ring 61, externally threaded and provided with two diametrically opposed depressions, not shown in the drawing, which allow it to be rotated by means of a suitable tool.

In order to allow ring 61 to be housed on the external surface of rest bushing 50, a step 52 is provided which is also suited to receive a radial lock ring 54. Lock ring 61 permits to assemble the valve in any position in respect of the fluid flow direction, in case that, that the valve is closed, the disassembly of one of the two pipes 30 or 30' is required. Indeed, if the fluid flow through the valve is in the direction shown by harrow F1 in FIG. 1, it is possible, if required, to close the valve by rotating the ball 41 thus disassembling the downstream pipe 30' with no danger that the rest bushing 50 of gasket 45' may be ejected from the valve body; in fact this is provided for by lock ring 61 which is screwed on thread 60 of the valve body 10.

Furthermore, the valve according to the invention, is characterized by two further features which make its use most convenient and safe.

Figure 4:
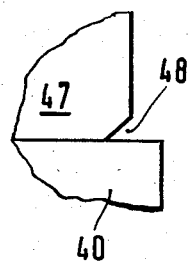
FIG. 4 an enlarged fragmentary view of a enlarged detail of the driving tang of the valve shutter shaft.
Figure 5:
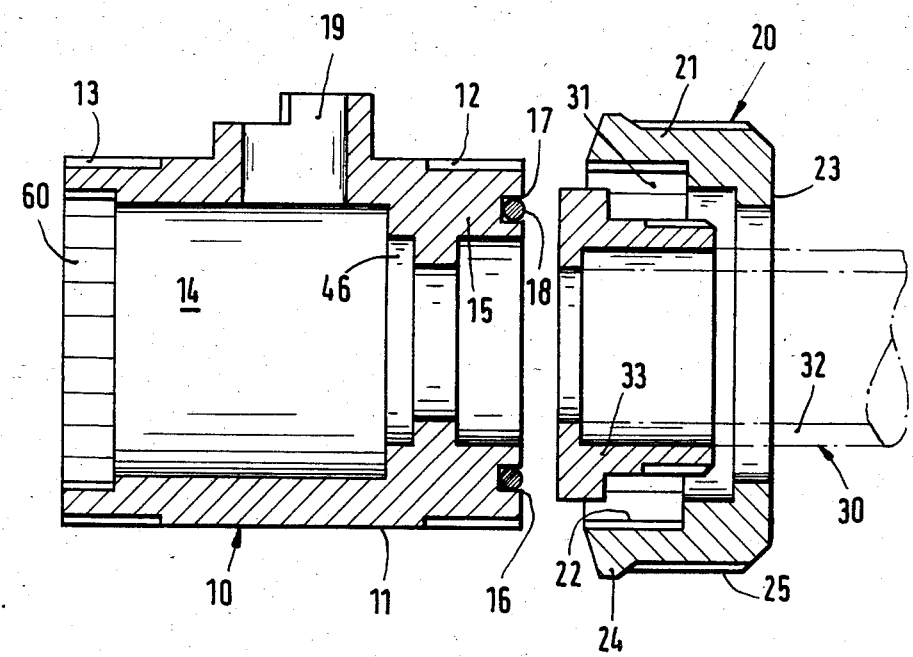
FIG. 5 is an exploded or open view of the valve body and of the elements converging on it from the right side of FIG. 1.
Figure 6:
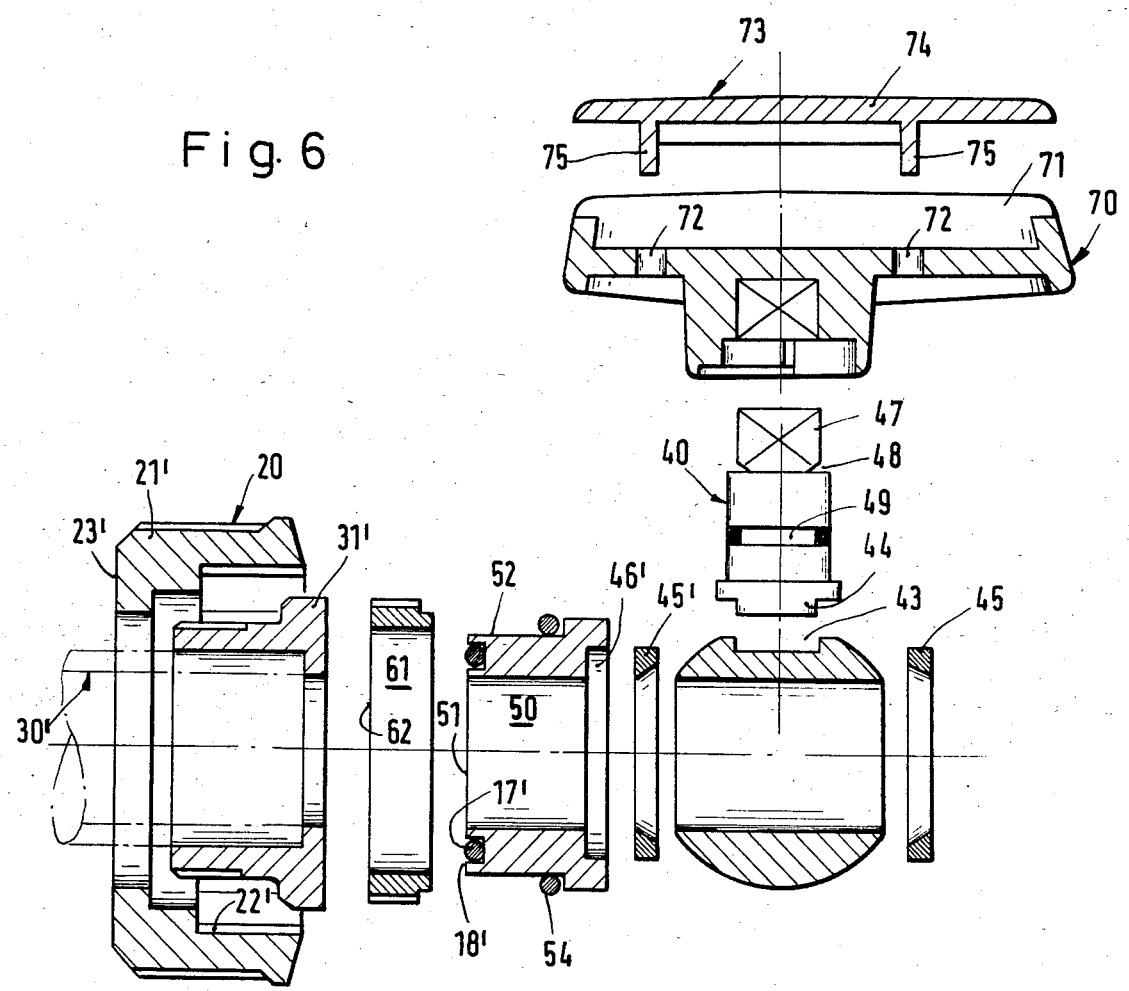
FIG. 6 is an exploded view of the remaining valve components according to the invention; essentially, FIGS. 5 and 6 could have been joined together as a single figure, had it not seemed more convenient to show the various details on a larger scale.

According to the invention, the valve upper tang 47 of drive shaft 40 of the ball 41, is provided at its base with a stress raiser 48, as shown in detail in FIG. 4. It follows that, if, owing to the ball jamming up, handle 70 engaged in upper tang 47 is forced beyond a given limit, the breaking of the shaft 40 will occur at the root of the upper tank 47, due to the presence of notchings 48 which act as a stress raisers.

Consequently the breakings of the shaft, at the root of upper tang 47, would not compromise the seal of the valve, the breaking section being external to the sealing means of the operating shaft 40; the sealing means consisting of a groove 49 into which there is inserted an O-ring pressing on the inner surface of passage 19 of valve body 10.

The result is the safe operation of the valve. From the point of view of convenience in the use of the valve, handle 70 is provided with a longitudinal groove 71 on which two passages 72 are provided.

In the groove 71, a tool 73 is housed which substantially consists of a prismatic bar 74 with a lower face from which two feet or projection 75 project, fit to be elastically inserted inside the openings 72 of the handle 70.

The distance between the two feet 75 is substantially equal to the mean diameter of the lock ring 61 and their thickness is less than the thickness of said lock ring. It is therefore possible to provide on the frontal surface 62 of lock ring 61 two depressions suited to receive feet 75; it follows that tool 73 can be used to screw or unscrew lock ring 61. Therefore, the valve according to the invention, turns out to be entirely provided with a disassembling and assembling means of lock ring 61.

Figure 2:
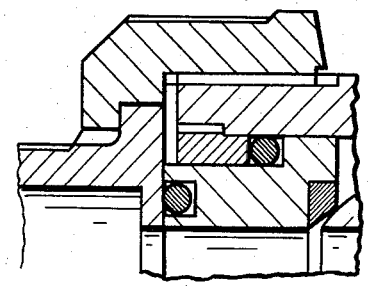
FIGS. 2 and 3 are fragmentary sectional views of the same detail, enlarged, in two different states of wear of the gaskets.
Figure 3:
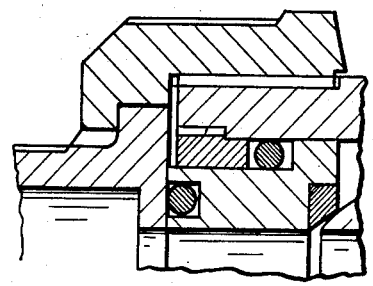

FIGS. 2 and 3 show a further advantage of the valve according to the invention: FIG. 2 refers to the event that the seal gaskets 45 and 45' are new so that seal ring 54 is tightened between the valve body 10, rest bushing 50 of gasket 45', and the lock ring 61. In such a case, nut 20' is screwed onto the valve body body 10 (by the quantity needed) to draw the frontal surface of flange 31' near O-ring gasket 18', to guarantee its hydraulic seal.

In this event, therefore, the rotatable ball is engaged longitudinally and elastically in view of the fact that the gasket 45' and the rest bushing 50 do not rest directly and therefore stiffly on lock ring 61 and flange 31', but through rubber O-ring gasket 54 and 18'.

When the elastic spring-back of gaskets is no longer sufficient to compensate for the wear of the ball 41 and of the gaskets 45-45', it will suffice to screw nut 20' which, by pressing flange 31' against the rest bushing 50, permits to take up the slack produced and reestablish the seal. The device, according to the invention, provides for other advantages; in the first place, the fact that it is possible for the rest bushing to run inside the lock ring allows to make up for the slacks formed because of wear of dilation, by operating quite simply on the external nut 20' with no prejudice to the running or interruptions.

In the second place, the fact that the seat of gasket 54 is delimited by three separate bodies (valve body-supporting valve-lock ring) allows for easier disassembly and assembly, due to reduction in interferences and consequent frictions.

What we claim is:

1. A ball valve comprising a valve body having an axial through bore open at opposite ends thereof and a radial passage radially of the bore and in communication with the bore, a valve stem extending axially in said radial passage and outwardly of the valve body, a rotatable ball in the bore connected to said valve stem for selective operation thereof, the ball having a diametrical passageway positionable selectively in communication with said valve body bore by selective manipulation of said valve stem for opening and closing the ball valve, said valve body having opposite ends externally threaded, two internally threaded external lock rings each removably threaded on a respective one of said externally threaded ends, two end bushings each disposed internally of a corresponding lock ring for each receiving an end of a respective pipe for connection in use to the valve body, the valve body having an annular internal flange extending inwardly and disposed coaxial with said bore inwardly of one of said end bushings, a ring seal disposed between said flange and said ball, an internal bushing internally of the valve body held inwardly by the end bushing at an end remote from said internal flange, a second ring seal disposed between the internal bushing and the ball, an internal lock ring in said axial bore circumferentially of an axial part of the internal bushing threaded onto an internal thread of the valve body at said end remote from the internal flange, and an elastic O-ring in said axial bore circumferentially of the internal bushing disposed for effecting a seal between the internal lock ring, said internal bushing, and surfaces of the valve body defining said axial bore of the valve body.

2. A ball valve according to claim 1, in which the internal lock ring has two depressions on an end face thereof remote from the ball-valve, the valve stem having an operating handle having a longitudinal groove on a top surface thereof, the groove having two axially spaced recesses, a plate removably received in said groove and having two spaced projections extending into the recesses, and said two projections being spaced and dimensioned to be received in the two depressions respectively so that said plate can be removed from the handle and the projections inserted into said depressions for use of the plate as a tool for threading and unthreading said internal lock ring.

* * * * *